United States Patent
Xiong et al.

(10) Patent No.: US 11,550,335 B2
(45) Date of Patent: Jan. 10, 2023

(54) BIPED ROBOT AND ITS MOVING METHOD AND APPARATUS

(71) Applicant: UBTECH ROBOTICS CORP., Guangdong (CN)

(72) Inventors: Youjun Xiong, Shenzhen (CN); Chunyu Chen, Shenzhen (CN); Yizhang Liu, Shenzhen (CN); Ligang Ge, Shenzhen (CN); Zheng Xie, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 312 days.

(21) Appl. No.: 16/753,408

(22) PCT Filed: Nov. 28, 2018

(86) PCT No.: PCT/CN2018/117987
§ 371 (c)(1),
(2) Date: Apr. 3, 2020

(87) PCT Pub. No.: WO2020/107279
PCT Pub. Date: Jun. 4, 2020

(65) Prior Publication Data
US 2022/0011772 A1    Jan. 13, 2022

(51) Int. Cl.
*B62D 57/032* (2006.01)
*G05D 1/02* (2020.01)

(52) U.S. Cl.
CPC ........... *G05D 1/027* (2013.01); *B62D 57/032* (2013.01); *G05D 2201/0217* (2013.01)

(58) Field of Classification Search
CPC .................. B62D 57/032; B62D 57/02; G05D 2201/0217; G05D 1/027; G05D 1/0212; B25J 9/16
USPC .......................................................... 701/26
See application file for complete search history.

(56) References Cited

U.S. PATENT DOCUMENTS

| | | | | |
|---|---|---|---|---|
| 6,301,524 B1 * | 10/2001 | Takenaka | ............... | B62D 57/02 318/568.12 |
| 7,386,364 B2 * | 6/2008 | Mikami | ................. | B62D 57/02 318/568.22 |
| 8,738,178 B2 * | 5/2014 | Choi | ..................... | B62D 57/032 700/250 |
| 8,965,573 B2 * | 2/2015 | Maisonnier | .......... | B62D 57/032 700/250 |
| 9,073,209 B2 * | 7/2015 | Lee | ....................... | B62D 57/032 |

(Continued)

FOREIGN PATENT DOCUMENTS

| | | | | |
|---|---|---|---|---|
| CN | 108858208 A | | 11/2018 | |
| CN | 108942885 A | * | 12/2018 | ............... A61H 3/00 |

OTHER PUBLICATIONS

ISR for PCT/CN2018/117987.
Written opinions of ISA for PCT/CN2018/117987.

*Primary Examiner* — B M M Hannan (57) ABSTRACT

The present disclosure discloses a biped robot and its moving method and apparatus. The method includes: calculating a motion state of each servo of legs of a biped robot according to an actual trajectory of the biped robot, and controlling the servo to rotate to the corresponding motion state. The scheme enables the biped robot to achieve flexible controls to the biped robot according to the received real-time external feedbacks.

18 Claims, 4 Drawing Sheets

(56) References Cited

U.S. PATENT DOCUMENTS

| | | | |
|---|---|---|---|
| 2005/0075755 A1* | 4/2005 | Takenaka | B62D 57/032 700/245 |
| 2005/0107916 A1* | 5/2005 | Nagasaka | B62D 57/02 700/245 |
| 2005/0240307 A1* | 10/2005 | Kuroki | B25J 13/088 700/245 |
| 2005/0267630 A1* | 12/2005 | Kajita | B62D 57/032 700/245 |
| 2006/0184276 A1* | 8/2006 | Takenaka | B62D 57/032 700/245 |
| 2011/0178636 A1* | 7/2011 | Kwon | B62D 57/032 901/1 |
| 2011/0178637 A1* | 7/2011 | Lee | B62D 57/032 700/254 |
| 2011/0224827 A1* | 9/2011 | Andoh | B62D 57/032 901/1 |
| 2012/0155775 A1* | 6/2012 | Ahn | G06T 7/73 701/527 |
| 2012/0316683 A1* | 12/2012 | Seo | B62D 57/032 901/1 |
| 2013/0178983 A1* | 7/2013 | Watabe | G05D 1/0251 700/258 |
| 2013/0218345 A1* | 8/2013 | Lee | B25J 9/162 700/261 |
| 2017/0036346 A1* | 2/2017 | Kamioka | B62D 57/032 |
| 2017/0225333 A1* | 8/2017 | Khripin | B25J 9/1694 |
| 2018/0004208 A1* | 1/2018 | Su | G05D 1/021 |
| 2019/0070729 A1* | 3/2019 | Kamioka | B25J 11/0035 |

* cited by examiner

BIPED ROBOT AND ITS MOVING METHOD AND APPARATUS

BACKGROUND

1. Technical Field

The present disclosure relates to robot technology, and particularly to a biped robot and its moving method and apparatus.

2. Description of Related Art

During the movement of a biped robot, there is a problem in its interaction with a human or external environment. When a biped robot is performing a task and encounters an obstacle during walking, the robot will hit the obstacle while it continues to walk, which is a walking manner in lack of intelligence. At present, some robots are controlled to realize autonomous walking by disposing a distance sensor to detect whether there are obstacles around the walking environment. However, because the accuracy of the distance sensor is low while the detection range of the distance sensor is small, the actual affection of the obstacles to the waling of the robot cannot be calculated accurately. In addition, in the environment of human-machine cooperation, if a person suddenly collides with the robot during walking, the robot will be knocked over, which will cause the robot to be damaged while affects the human safety in a certain extent.

Therefore, it is necessary to propose a new biped robot moving method.

SUMMARY

The main objective of the present disclosure is to provide a method for controlling the movement of a biped robot according to the actual movement trajectory of the robot.

The present disclosure proposes a biped robot moving method including:

obtaining an actual movement trajectory $X_{d\_new}$ of the biped robot;

calculating target angles $\theta_{lb}$ and $\theta_{rb}$ of servos of two legs of the biped robot, respectively, according to the actual movement trajectory $X_{d\_new}$, where each leg of the biped robot is composed of a plurality of servos connected sequentially in series; and controlling each servo of the two legs of the biped robot to rotate to angles corresponding to the target angles $\theta_{lb}$ and $\theta_{rb}$, respectively.

Furthermore, the step of obtaining the actual movement trajectory $X_{d\_new}$ of the biped robot includes:

collecting force data of a six-dimensional sensor on a sole of each of the two legs of the biped robot, and angle data of the servos of each leg of the biped robot;

calculating force information upon the biped robot according to the force data and the angle data; and calculating an actual movement trajectory of the biped robot based on the force information and attribute information of the biped robot.

Furthermore, the step of the step of calculating the force information upon the biped robot according to the force data and the angle data includes:

generating matrices $F_l$ and $F_r$ based on the force data of each sole, and generating matrices $\theta_{la}$ and $\theta_{ra}$ based on the angular data of each leg;

calculating a Jacobian matrix of the two legs based on the matrices $\theta_{la}$ and $\theta_{ra}$, respectively, to obtain matrices $J_l$ and $J_r$; and calculating the force information upon the biped robot through a formula $F_b = J_l^T F_l + J_r^T F_r$, where $F_b$ represents the force information upon the biped robot.

Furthermore, the step of calculating the actual movement trajectory of the biped robot based on the force information and the attribute information of the biped robot includes:

calculating an acceleration of the biped robot based on the force information and a body mass of the biped robot;

calculating a change trajectory of a centroid according to the acceleration of the biped robot and a movement speed of the biped robot; and obtaining the actual trajectory of the biped robot by adding the change trajectory of the centroid and a planned movement trajectory of the biped robot.

Furthermore, the step of calculating the target angles $\theta_{lb}$ and $\theta_{rb}$ of the servos of two legs of the biped robot, respectively, according to the actual movement trajectory $X_{d\_new}$ includes:

calculating the target angles $\theta_{lb}$ and $\theta_{rb}$ by inputting the actual movement trajectory to a body centroid position in inverse kinematics.

Furthermore, each leg of the biped body robot includes 6 servos.

The present disclosure further proposes a biped robot moving apparatus including:

an obtaining module configured to obtain an actual movement trajectory $X_{d\_new}$ of the biped robot;

a calculation module configured to calculate target angles $\theta_{lb}$ and $\theta_{rb}$ of servos of two legs of the biped robot, respectively, according to the actual movement trajectory $X_{d\_new}$, where each leg of the biped robot is composed of a plurality of servos connected sequentially in series; and a control module configured to control each servo of the two legs of the biped robot to rotate to angles corresponding to the target angles $\theta_{lb}$ and $\theta_{rb}$, respectively.

The present disclosure further proposes a biped robot including a memory and a processor, where the memory stores a computer program, and the steps of any of the above-mentioned methods are implemented when the processor executes the computer program.

The present disclosure further proposes a computer storage medium storing a computer program, where the steps of any of the above-mentioned methods are implemented when the computer program is executed by a processor.

In the present disclosure, the biped robot and its moving method and apparatus calculate the difference between the expected movement trajectory and the actual movement trajectory of the biped robot according to the force conditions upon the soles and the joint angles of the legs of the biped robot, so as to realize the real-time closed-loop control of the movement of the robot. Since a controller of the biped robot collects the force on the biped robot itself, it can quickly change the movement trajectory according to the external force on the biped robot, thereby preventing the biped robot from colliding with other objects or humans, which realize safe interactions between the biped robot and the exterior.

DETAILED DESCRIPTION

It should be understood that, the embodiments described herein are only used to explain the present disclosure and are not intended to limit the present disclosure.

Figure 1:
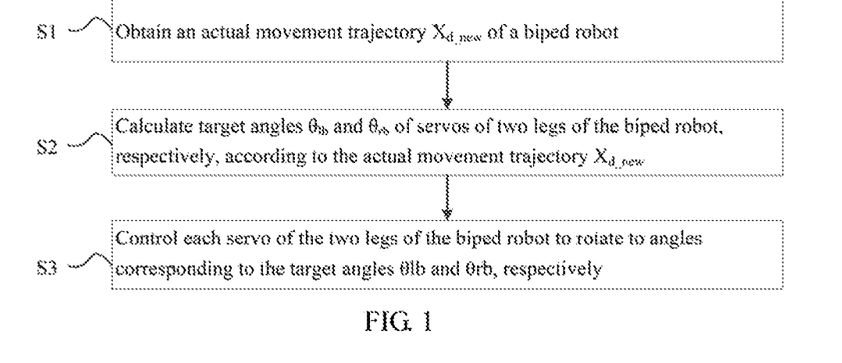
FIG. 1 is a flow chart of a biped robot moving method according to an embodiment of the present disclosure.

Referring to FIG. 1, the present disclosure proposes a biped robot moving method including the following steps:

S1: obtaining an actual movement trajectory $X_{d\_new}$ of a biped robot;

S2: calculating target angles $\theta_{lb}$ and $\theta_{rb}$ of servos of two legs of the biped robot, respectively, according to the actual movement trajectory $X_{d\_new}$, where each leg of the biped robot is composed of a plurality of servos connected sequentially in series; and S3: controlling each servo of the two legs of the biped robot to rotate to angles corresponding to the target angles $\theta_{lb}$ and $\theta_{rb}$, respectively.

As described in step S1 above, after receiving an instruction, the biped robot will generate the movement trajectory according to the position of its centroid during the movement. According to the task performed, there will be the predetermined planned movement trajectory $X_d$, that is, the movement route of the robot is a fixed movement trajectory set according to the instruction. In the case that the robot is subject to external resistance during the movement, for instance, when a human suddenly comes over to collide with the biped robot, the movement trajectory of the biped robot will be changed, and a new movement trajectory, that is, the actual movement trajectory represented as $X_{d\_new}$ will be produced. A controller of the biped robot will obtain the actual movement trajectory.

Figure 2:
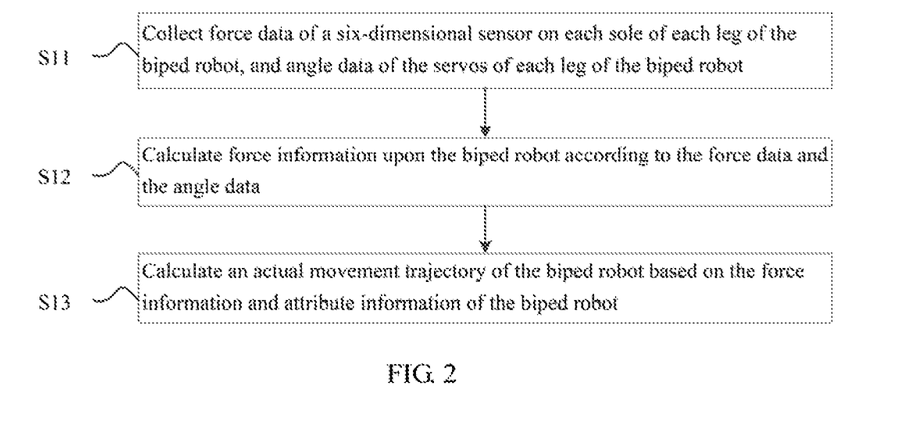
FIG. 2 is a flow chart of step S1 of the biped robot moving method according to an embodiment of the present disclosure.

Referring to FIG. 2, step S1 of obtaining the actual movement trajectory $X_{d\_new}$ of the biped robot includes the following steps:

S11: collecting force data of a six-dimensional sensor on a sole of each of the two legs of the biped robot, and angle data of the servos of each leg of the biped robot;

S12: calculating force information upon the biped robot according to the force data and the angle data; and S13: calculating an actual movement trajectory of the biped robot based on the force information and attribute information of the biped robot.

As described in step S11 above, each of the two soles of the two legs of the biped robot is equipped with a six-dimensional sensor for detecting a six-dimensional force on the sole, where the detected six-dimensional forces on the two soles are $F_l$ and $F_r$, respectively. The six-dimensional forces represent the pressure and torque force of three directions in a three-dimensional space. The six-dimensional force $F_l=[F_{lx}\ F_{ly}\ F_{lz}\ \tau_{lx}\ \tau_{lx}\ \tau_{lx}]^T$ and the six-dimensional force $F_r=[F_{rx}\ F_{ry}\ F_{rz}\ \tau_{rx}\ \tau_{rx}\ \tau_{rx}]^T$, where $F_l$ represents the six-dimensional force on the left sole of the left leg, $F_r$ represents the six-dimensional force on the right sole of the right leg. The leg of the biped robot is formed by connecting a plurality of servos in series. In a specific embodiment, each leg has six servos, and the controller controls the servos to rotate to specified angles so as to control the biped robot to walk. A servo is driven by a motor, and the movement of each leg is realized by the motors of the leg to rotate an output shaft of each servo of the leg. An output shaft of each servo can rotate 360 degrees, and different angles of the output shaft of the servos represent different states of the leg of the robot. Hereinafter, an angle of a servo means a rotational angle of an output shaft of the servo. The controller detects the angles of the six servos on each leg to obtain two matrices which respectively represent the angles $\theta_{la}$ of the six servos on the left leg and the angles $\theta_{ra}$ of the six servos on the right leg. The angles of the six servos of the two legs from top to bottom are respectively $\theta_{la}=[\theta_{l1}\ \theta_{l2}\ \theta_{l3}\ \theta_{l4}\ \theta_{l5}\ \theta_{l6}]^T$ and $\theta_{ra}=[\theta_{r1}\ \theta_{r2}\ \theta_{r3}\ \theta_{r4}\ \theta_{r5}\ \theta_{r6}]^T$.

As described in step S12 above, the controller then calculates the Jacobian matrix of $\theta_{la}$ to obtain the matrix $J_l$ and calculates the Jacobian matrix of $\theta_{ra}$ to obtain the matrix $J_r$. And then, $F_l$, $F_r$, $J_l$, and $J_r$ are input into the formula $F_b=J_l^T F_l + J_r^T F_r$ to calculate $F_b$, where $F_b$ represents force information upon a body of the biped robot.

As described in step S13 above, the controller can calculate the actual trajectory of the biped robot based on the force information upon the body of the biped robot and the attributes of the biped robot itself such as the mass M of the biped robot itself, the damping coefficient B of a flexible control device, and the stiffness coefficient K.

Figure 3:
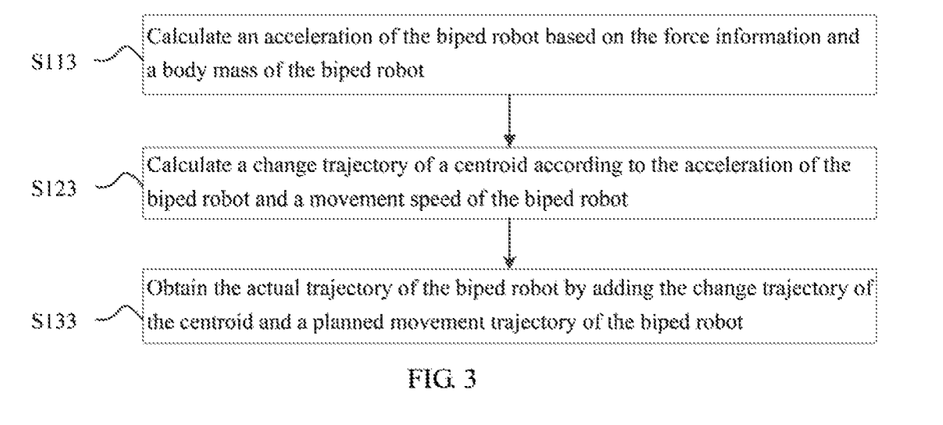
FIG. 3 is a flow chart of step S13 of the biped robot moving method according to an embodiment of the present disclosure.

Referring to FIG. 3, step S13 of calculating the actual movement trajectory of the biped robot based on the force information $F_b$ and the attribute information of the biped robot includes the following steps:

S113: calculating an acceleration of the biped robot based on the force information and a body mass of the biped robot;

S123: calculate a change trajectory of a centroid according to the acceleration of the biped robot and a movement speed of the biped robot; and S133: obtaining the actual trajectory of the biped robot by adding the change trajectory of the centroid and a planned movement trajectory of the biped robot.

In this embodiment, after the force information Fb is calculated, according to Newton's second law, the acceleration of the biped robot is calculated using the formula $a(t)=F_b/M$. Then, the change trajectory $X(t)$ of the centroid of the biped robot is calculated according to the formula $X(t)=V_0 t+\frac{1}{2}a(t)t^2$. Finally, the change trajectory $X(t)$ of the centroid of the biped robot is added by the planned movement trajectory $X_d$ of the biped robot so as to obtain the actual movement trajectory of the biped robot.

In another embodiment for calculating $X(t)$, after calculating the force information $F_b$, the attribute information of the robot including the body mass M, the damping coefficient B, and the stiffness coefficient K are retrieved from the storage of the robot. According to these four data, the impedance algorithm is used to calculate the change X of the position of the centroid of the biped robot using the formula:

$$M\ddot{X}+B\dot{X}+KX=F_b;$$

where, X is the change of the position of the centroid of the biped robot, and S is the Laplacian operator.

The change of the trajectory of the centroid in the frequency domain is converted into the time domain using the following formula:

$$X=\frac{F_b}{Ms^2+Bs+K};$$

then, the change trajectory $X(t)$ of the centroid in the time domain is obtained through the inverse Laplace transform.

As described in step S2 above, after obtaining the actual movement trajectory of the biped robot, it is input by the controller to the position of the centroid of the body in inverse kinematics to obtain the target angles of the servos of the two legs of the biped robot, that is, the angles $\theta_{lb}$ of the six servos of the left leg and the angles $\theta_{rb}$ of the six servos of the right leg using the formula as follows:

$$[\theta_{lb},\theta_{rb}]^T=IK(X_{d\_new}).$$

As described in step S3 above, the controller simultaneously controls the servos of the legs to rotate to the corresponding target angles according to the corresponding angles $\theta_{lb}$ and $\theta_{rb}$ of the two servos, so as to complete the movement of the biped robot.

In the present disclosure, the biped robot moving method calculates the difference between the expected movement trajectory and the actual movement trajectory of the biped robot according to the force conditions upon the soles and the joint angles of the legs of the biped robot, so as to realize the real-time closed-loop control of the movement of the robot. Since the controller of the biped robot collects the force on the biped robot itself, it can quickly change the movement trajectory according to the external force on the biped robot, thereby preventing the biped robot from colliding with other objects or humans, which realize safe interactions between the biped robot and the exterior.

Figure 4:
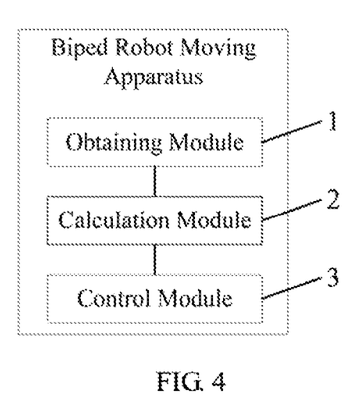
FIG. 4 is a schematic block diagram of a biped robot moving apparatus according to an embodiment of the present disclosure.

The present disclosure further proposes a biped robot moving apparatus including:

an obtaining module 1 configured to obtain an actual movement trajectory $X_{d\_new}$ of the biped robot;

a calculation module 2 configured to calculate target angles $\theta_{lb}$ and $\theta_{rb}$ of servos of two legs of the biped robot, respectively, according to the actual movement trajectory $X_{d\_new}$, where each leg of the biped robot is composed of a plurality of servos connected sequentially in series; and a control module 3 configured to control each servo of the two legs of the biped robot to rotate to angles corresponding to the target angles $\theta_{lb}$ and $\theta_{rb}$, respectively.

In this embodiment, after receiving an instruction, the biped robot will generate the movement trajectory according to the position of its centroid during the movement. According to the task performed, there will be the predetermined planned movement trajectory $X_d$, that is, the movement route of the robot is a fixed movement trajectory set according to the instruction. In the case that the robot is subject to external resistance during the movement, for instance, when a human suddenly comes over to collide with the biped robot, the movement trajectory of the biped robot will be changed, and a new movement trajectory, that is, the actual movement trajectory represented as $X_{d\_new}$ will be produced. The controller of the biped robot will obtain the actual movement trajectory.

After obtaining the actual movement trajectory of the biped robot, it is input by the controller to the position of the centroid of the body in inverse kinematics to obtain the target angles of the servos of the two legs of the biped robot, that is, the angles $\theta_{lb}$ of the six servos of the left leg and the angles $\theta_{rb}$ of the six servos of the right leg using the formula as follows:

$$[\theta_{lb},\theta_{rb}]^T=IK(X_{d\_new}).$$

The controller simultaneously controls the servos of the legs to rotate to the corresponding target angles according to the corresponding angles $\theta_{lb}$ and $\theta_{rb}$ of the two servos, so as to complete the movement of the biped robot.

In the present disclosure, the biped robot moving apparatus calculates the difference between the expected movement trajectory and the actual movement trajectory of the biped robot according to the force conditions upon the soles and the joint angles of the legs of the biped robot, so as to realize the real-time closed-loop control of the movement of the robot. Since the controller of the biped robot collects the force on the biped robot itself, it can quickly change the movement trajectory according to the external force on the biped robot, thereby preventing the biped robot from colliding with other objects or humans, which realize safe interactions between the biped robot and the exterior.

The present disclosure further proposes a biped robot which includes a processor, a storage, a network interface, and a database that are connected through a system bus. In which, the processor designed for the biped robot is configured to provide calculation and control capabilities. The storage of the biped robot includes a non-volatile storage medium and a memory. The non-volatile storage medium stores an operating system, computer programs, and a database. The memory provides an environment for executing the operating system and computer programs in the non-volatile storage medium. The database is used to store the angles of the servos and other data of the biped robot. The network interface of the biped robot is configured to communicate with external terminals through a network. The biped robot implements a biped robot moving method when executed by the processor.

The steps of the above-mentioned biped robot moving method executed by the above-mentioned processor include: obtaining an actual movement trajectory $X_{d\_new}$ of the biped robot; calculating target angles $\theta_{lb}$ and $\theta_{rb}$ of servos of two legs of the biped robot, respectively, according to the actual movement trajectory $X_{d\_new}$, where each leg of the biped robot is composed of a plurality of servos connected sequentially in series; and controlling each servo of the two legs of the biped robot to rotate to angles corresponding to the target angles $\theta_{lb}$ and $\theta_{rb}$, respectively.

In one embodiment, the step of obtaining the actual movement trajectory $X_{d\_new}$ of the biped robot executed by the above-mentioned processor includes: collecting force data of a six-dimensional sensor on a sole of each of the two legs of the biped robot, and angle data of the servos of each leg of the biped robot; calculating force information upon the biped robot according to the force data and the angle data; and calculating an actual movement trajectory of the biped robot based on the force information and attribute information of the biped robot.

In one embodiment, the step of calculating the force information upon the biped robot according to the force data and the angle data includes: generating matrices $F_l$ and $F_r$ based on the force data of each sole, and generating matrices $\theta_{la}$ and $\theta_{ra}$ based on the angular data of each leg; calculating a Jacobian matrix of the two legs based on the matrices $\theta_{la}$ and $\theta_{ra}$, respectively, to obtain matrices $J_l$ and $J_r$; and calculating the force information upon the biped robot through a formula $F_b=J_l^T F_l+J_r^T F_r$, where $F_b$ represents the force information upon the biped robot.

In one embodiment, the step of calculating the actual movement trajectory of the biped robot based on the force information and the attribute information of the biped robot includes: calculating an acceleration of the biped robot based on the force information and a body mass of the biped robot; calculating a change trajectory of a centroid according to the acceleration of the biped robot and a movement speed of the biped robot; and obtaining the actual trajectory of the biped robot by adding the change trajectory of the centroid and a planned movement trajectory of the biped robot.

In one embodiment, the processor executes the step of calculating the target angles $\theta_{lb}$ and $\theta_{rb}$ of the servos of two legs of the biped robot, respectively, according to the actual movement trajectory $X_{d\_new}$ includes: calculating the target angles $\theta_{lb}$ and $\theta_{rb}$ by inputting the actual movement trajectory to a body centroid position in inverse kinematics.

In summary, the biped robot calculates the difference between the expected movement trajectory and the actual movement trajectory of the biped robot according to the force conditions upon the soles and the joint angles of the legs of the biped robot, so as to realize the real-time closed-loop control of the movement of the robot. Since the controller of the biped robot collects the force on the biped robot itself, it can quickly change the movement trajectory according to the external force on the biped robot, thereby preventing the biped robot from colliding with other objects or humans, which realize safe interactions between the biped robot and the exterior.

The present disclosure further proposes a computer storage medium stored with a computer program. A biped robot moving method is implemented when the computer program is executed by a processor, which includes: obtaining an actual movement trajectory $X_{d\_new}$ of the biped robot; calculating target angles $\theta_{lb}$ and $\theta_{rb}$ of servos of two legs of the biped robot, respectively, according to the actual movement trajectory $X_{d\_new}$, where each leg of the biped robot is composed of a plurality of servos connected sequentially in series; and controlling each servo of the two legs of the biped robot to rotate to angles corresponding to the target angles $\theta_{lb}$ and $\theta_{rb}$, respectively.

In one embodiment, the step of obtaining the actual movement trajectory $X_{d\_new}$ of the biped robot executed by the above-mentioned processor includes: collecting force data of a six-dimensional sensor on a sole of each of the two legs of the biped robot, and angle data of the servos of each leg of the biped robot; calculating force information upon the biped robot according to the force data and the angle data; and calculating an actual movement trajectory of the biped robot based on the force information and attribute information of the biped robot.

In one embodiment, the step of calculating the force information upon the biped robot according to the force data and the angle data includes: generating matrices $F_l$ and $F_r$ based on the force data of each sole, and generating matrices $\theta_{la}$ and $\theta_{ra}$ based on the angular data of each leg; calculating a Jacobian matrix of the two legs based on the matrices $\theta_{la}$ and $\theta_{ra}$, respectively, to obtain matrices $J_l$ and $J_r$; and calculating the force information upon the biped robot through a formula $F_b = J_l^T F_l + J_r^T F_r$, where $F_b$ represents the force information upon the biped robot.

In one embodiment, the step of calculating the actual movement trajectory of the biped robot based on the force information and the attribute information of the biped robot includes: calculating an acceleration of the biped robot based on the force information and a body mass of the biped robot; calculating a change trajectory of a centroid according to the acceleration of the biped robot and a movement speed of the biped robot; and obtaining the actual trajectory of the biped robot by adding the change trajectory of the centroid and a planned movement trajectory of the biped robot.

In one embodiment, the processor executes the step of calculating the target angles $\theta_{lb}$ and $\theta_{rb}$ of the servos of two legs of the biped robot, respectively, according to the actual movement trajectory $X_{d\_new}$ includes: calculating the target angles $\theta_{lb}$ and $\theta_{rb}$ by inputting the actual movement trajectory to a body centroid position in inverse kinematics. In summary, the computer storage medium calculates the difference between the expected movement trajectory and the actual movement trajectory of the biped robot according to the force conditions upon the soles and the joint angles of the legs of the biped robot, so as to realize the real-time closed-loop control of the movement of the robot. Since the controller of the biped robot collects the force on the biped robot itself, it can quickly change the movement trajectory according to the external force on the biped robot, thereby preventing the biped robot from colliding with other objects or humans, which realize safe interactions between the biped robot and the exterior.

The forgoing are only preferred embodiments of the present disclosure, which are not for limit the scope of the present disclosure. All the equivalent structure or process transformations made by using the description and drawings of the present disclosure, or direct or indirect applications in other related techniques are all included in the scope of the present disclosure.

What is claimed is:

1. A computer-implemented moving method for a biped robot, comprising executing on a processor steps of:
    obtaining an actual movement trajectory $X_{d\_new}$ of the biped robot;
    calculating target angles $\theta_{lb}$ and $\theta_{rb}$ of servos of two legs of the biped robot, respectively, according to the actual movement trajectory $X_{d\_new}$, wherein each leg of the biped robot is composed of a plurality of servos connected sequentially in series; and
    controlling each servo of the two legs of the biped robot to rotate to angles corresponding to the target angles $\theta_{lb}$ and $\theta_{rb}$, respectively;
    wherein a sole of each of the two legs of the biped robot is equipped with a six-dimensional sensor for detecting a six-dimensional force on the sole, and the step of obtaining the actual movement trajectory $X_{d\_new}$ of the biped robot comprises:
        collecting force data of the six-dimensional sensor on the sole of each of the two legs of the biped robot, and angle data of the servos of each leg of the biped robot;
        calculating force information upon a body of the biped robot according to the force data and the angle data; and
        calculating the actual movement trajectory of the biped robot based on the force information and attribute information of the biped robot.

2. The method of claim 1, wherein the step of calculating the force information upon the body of the biped robot according to the force data and the angle data comprises:
    generating matrices $F_l$ and $F_r$ based on the force data of each sole, and generating matrices $\theta_{la}$ and $\theta_{ra}$ based on the angular data of each leg;
    calculating a Jacobian matrix of the two legs based on the matrices $\theta_{la}$ and $\theta_{ra}$, respectively, to obtain matrices $J_l$ and $J_r$; and
    calculating the force information upon the body of the biped robot through a formula $F_b = J_l^T F_l + J_r^T F_r$, where $F_b$ represents the force information upon the body of the biped robot.

3. The method of claim 1, wherein the step of calculating the actual movement trajectory of the biped robot based on the force information and the attribute information of the biped robot comprises:
    calculating an acceleration of the biped robot based on the force information and a body mass of the biped robot;

calculating a change trajectory of a centroid according to the acceleration of the biped robot and a movement speed of the biped robot; and obtaining the actual trajectory of the biped robot by adding the change trajectory of the centroid and a planned movement trajectory of the biped robot.

4. The method of claim 1, wherein the step of calculating the target angles $\theta_{lb}$ and $\theta_{rb}$ of the servos of two legs of the biped robot, respectively, according to the actual movement trajectory $X_{d\_new}$ comprises:

calculating the target angles $\theta_{lb}$ and $\theta_{rb}$ inputting the actual movement trajectory to a body centroid position in inverse kinematics.

5. The method of claim 1, wherein each leg of the biped body robot comprises 6 servos.

6. The method of claim 1, wherein the step of calculating the actual movement trajectory of the biped robot based on the force information and attribute information of the biped robot comprises:

retrieving the attribute information of the biped robot from a storage of the biped robot, wherein the attribute information of the biped robot comprises: a body mass, a damping coefficient, and a stiffness coefficient;

calculating a change trajectory of the centroid of the biped robot according to the force information, the body mass, the damping coefficient, and the stiffness coefficient, using a impedance algorithm and a inverse Laplace transform; and obtaining the actual trajectory of the biped robot by adding the change trajectory of the centroid and a planned movement trajectory of the biped robot.

7. A moving apparatus for a biped robot, comprising:

an obtaining module configured to obtain an actual movement trajectory $X_{d\_new}$ of the biped robot;

a calculation module configured to calculate target angles $\theta_{lb}$ and $\theta_{rb}$ of servos of two legs of the biped robot, respectively, according to the actual movement trajectory $X_{d\_new}$, wherein each leg of the biped robot is composed of a plurality of servos connected sequentially in series; and a control module configured to control each servo of the two legs of the biped robot to rotate to angles corresponding to the target angles $\theta_{lb}$ and $\theta_{rb}$, respectively;

wherein a sole of each of the two legs of the biped robot is equipped with a six-dimensional sensor for detecting a six-dimensional force on the sole, and the obtaining module is further configured to:

collect force data of the six-dimensional sensor on the sole of each of the two legs of the biped robot, and angle data of the servos of each leg of the biped robot;

calculate force information upon a body of the biped robot according to the force data and the angle data; and calculate the actual movement trajectory of the biped robot based on the force information and attribute information of the biped robot.

8. The moving apparatus of claim 7, wherein the obtaining module is further configured to:

generate matrices $F_l$ and $F_r$ based on the force data of each sole, and generating matrices $\theta_{la}$ and $\theta_{ra}$ based on the angular data of each leg;

calculate a Jacobian matrix of the two legs based on the matrices $\theta_{la}$ and $\theta_{ra}$, respectively, to obtain matrices $J_l$ and $J_r$; and calculate the force information upon the body of the biped robot through a formula $F_b = J_l^T F_l + J_r^T F_r$, where $F_b$ represents the force information upon the body of the biped robot.

9. The moving apparatus of claim 7, wherein the obtaining module is further configured to:

calculate an acceleration of the biped robot based on the force information and a body mass of the biped robot;

calculate a change trajectory of a centroid according to the acceleration of the biped robot and a movement speed of the biped robot; and obtain the actual trajectory of the biped robot by adding the change trajectory of the centroid and a planned movement trajectory of the biped robot.

10. The moving apparatus of claim 7, wherein the calculation module is further configured to:

calculate the target angles $\theta_{lb}$ and $\theta_{rb}$ by inputting the actual movement trajectory to a body centroid position in inverse kinematics.

11. The moving apparatus of claim 7, wherein each leg of the biped body robot comprises 6 servos.

12. The moving apparatus of claim 7, wherein the obtaining module is further configured to:

retrieve the attribute information of the biped robot from a storage of the biped robot, wherein the attribute information of the biped robot comprises: a body mass, a damping coefficient, and a stiffness coefficient;

calculate a change trajectory of the centroid of the biped robot according to the force information, the body mass, the damping coefficient, and the stiffness coefficient, using a impedance algorithm and a inverse Laplace transform; and obtain the actual trajectory of the biped robot by adding the change trajectory of the centroid and a planned movement trajectory of the biped robot.

13. A biped robot comprising:

a memory; and a processor;

wherein the memory stores a computer program executable on the processor, and the computer program comprises:

instructions for obtaining an actual movement trajectory $X_{d\_new}$ of the biped robot;

instructions for calculating target angles $\theta_{lb}$ and $\theta_{rb}$ of servos of two legs of the biped robot, respectively, according to the actual movement trajectory $X_{d\_new}$, wherein each leg of the biped robot is composed of a plurality of servos connected sequentially in series; and instructions for controlling each servo of the two legs of the biped robot to rotate to angles corresponding to the target angles $\theta_{lb}$ and $\theta_{rb}$, respectively;

wherein a sole of each of the two legs of the biped robot is equipped with a six-dimensional sensor for detecting a six-dimensional force on the sole, and the instructions for obtaining the actual movement trajectory $X_{d\_new}$ of the biped robot comprise:

instructions for collecting force data of the six-dimensional sensor on the sole of each of the two legs of the biped robot, and angle data of the servos of each leg of the biped robot;

instructions for calculating force information upon the biped robot according to the force data and the angle data; and instructions for calculating the actual movement trajectory of the biped robot based on the force information and attribute information of the biped robot.

14. The robot of claim 13, wherein each of two legs of the biped robot comprises 6 servos.

15. The robot of claim 13, wherein the instructions for calculating the force information upon the body of the biped robot according to the force data and the angle data comprise:
- instructions for generating matrices $F_l$ and $F_r$ based on the force data of each sole, and generating matrices $\theta_{la}$ and $\theta_{ra}$ based on the angular data of each leg;
- instructions for calculating a Jacobian matrix of the two legs based on the matrices $\theta_{la}$ and $\theta_{ra}$, respectively, to obtain matrices $J_l$ and $J_r$; and
- instructions for calculating the force information upon the body of the biped robot through a formula $F_b = J_l^T F_l + J_r^T F_r$, where $F_b$ represents the force information upon the body of the biped robot.

16. The robot of claim 13, wherein the instructions for calculating the actual movement trajectory of the biped robot based on the force information and the attribute information of the biped robot comprise:
- instructions for calculating an acceleration of the biped robot based on the force information and a body mass of the biped robot;
- instructions for calculating a change trajectory of a centroid according to the acceleration of the biped robot and a movement speed of the biped robot; and
- instructions for obtaining the actual trajectory of the biped robot by adding the change trajectory of the centroid and a planned movement trajectory of the biped robot.

17. The robot of claim 13, wherein the instructions for calculating the target angles $\theta_{lb}$ and $\theta_{rb}$ of the servos of two legs of the biped robot, respectively, according to the actual movement trajectory $X_{d\_new}$ comprise:
- instructions for calculating the target angles $\theta_{lb}$ and $\theta_{rb}$ by inputting the actual movement trajectory to a body centroid position in inverse kinematics.

18. The robot of claim 13, wherein the instructions for calculating the actual movement trajectory of the biped robot based on the force information and attribute information of the biped robot comprise:
- instructions for retrieving the attribute information of the biped robot from a storage of the biped robot, wherein the attribute information of the biped robot comprises: a body mass, a damping coefficient, and a stiffness coefficient;
- instructions for calculating a change trajectory of the centroid of the biped robot according to the force information, the body mass, the damping coefficient, and the stiffness coefficient, using a impedance algorithm and a inverse Laplace transform; and
- instructions for obtaining the actual trajectory of the biped robot by adding the change trajectory of the centroid and a planned movement trajectory of the biped robot.

* * * * *